United States Patent Office 3,017,385
Patented Jan. 16, 1962

3,017,385
NOVEL ORGANOPOLYSILOXANES

Murray M. Sprung, Schenectady, N.Y., and Frederick O. Guenther, Louisville, Ky., assignors to General Electric Company, a corporation of New York
No Drawing. Filed Jan. 21, 1959, Ser. No. 788,068
4 Claims. (Cl. 260—46.5)

This invention relates to novel phenylpolysiloxanes and more particularly is concerned with benzene-soluble, infusible phenylpolysiloxanes having an average of one phenyl group per silicon atom and having an intrinsic viscosity in benzene (determined in the manner hereinafter described) of from 0.10 to 0.30. The invention also includes methods for making the above-identified phenylpolysiloxane compositions.

When a phenyltrihydrolyzable silane, i.e., a phenyltrifunctional silane, such as phenyltrichlorosilane, is hydrolyzed with water, a vigorous reaction sets in with rapid replacement of the silicon-bonded chlorine atoms with Si—OH groups and concurrent condensation of the silanol groups thus formed to give generally cross-linked resins or gels which are of little utility. When this hydrolysis is carried out in a solvent such as diethyl ether, some diminution in the degree of gelation may be obtained. However, this dilution limits the degree of polymerization by favoring increased cyclization and less complete silanol condensation so that when carried out in solvents of this type, the hydrolysis of a trifunctional organo-substituted silane, for instance, phenyltrichlorosilane, will give very low molecular weight polysiloxanes. Attempts in the past have been made to obtain soluble (e.g., in benzene) high molecular weight polysiloxanes from a phenyltrihydrolyzable silane but these have not met with success. For the most part, although such efforts have resulted in somewhat increased molecular weight, the molecular weight of the phenyl-substituted polysiloxane thus obtained has been minimized by the tendency of the phenylsilsesquioxane groups to cyclicize to give cage-like structures. This is particularly true of alkyltrihydrolyzable silanes, examples of which may be found in Barry et al. Patent 2,465,188, issued March 22, 1949, which deals solely with low polymeric alkylsilsesquioxanes.

Attempts to apply the techniques used in making poly(alkylsilsesquioxanes) to making poly(phenylsilsesquioxanes) have generally not proved to be satisfactory. For example, in an article by Barry et al. in Journal of American Chemical Society, vol. 77, page 4248 (1955), it is pointed out that attempts to prepare phenylsilsesquioxanes by a thermal, alkali-catalyzed process failed even though the process employed was successful in the preparation of, for instance, alkylsilsesquioxanes. The procedure employed by Barry and his coworkers resulted in a hexameric crystalline phenylsilsesquioxane which was identified as containing approximately 6 units of the formula $C_6H_5SiO_{3/2}$. It is thus evident that in the past no successful means has been found for obtaining useful high molecular weight poly(phenylsilsesquioxanes).

Unexpectedly, we have discovered that we are able to prepare and obtain phenylpolysiloxanes which are benzene-soluble, and although having a ratio of about one phenyl group per silicon atom, are still of relatively high molecular weight as evidenced by the fact that their intrinsic viscosities in benzene are within the range of from 0.10 to 0.30. Moreover, contrary to the usual cyclization which occurs when one prepares hydrolyzates from a phenyltrihydrolyzable silane, the phenylpolysiloxanes of our invention are composed primarily of an arrangement of groupings of the formula

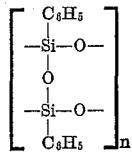

where $n$ is an integer appreciably greater than 6, for instance, up to 25 to 50 and in some instances even higher. The presence of up to about 0.75% silicon-bonded hydroxyl groups in our polymers is not precluded.

In accordance with a preferred method for making these higher molecular weight phenylpolysiloxanes (which, although substantially infusible, are soluble in benzene as well as in chloroform and tetrahydrofuran), phenyltriethoxysilane is dissolved in an oxygenated solvent, e.g., a ketone such as isobutyl methyl ketone, and this mixture is heated, e.g., at its boiling point, with a small amount of water and an alkaline material (preferably in aqueous solution) such as potassium hydroxide, quaternary ammonium compounds (e.g., tetraethyl ammonium hydroxide, tetrabutyl ammonium hydroxide, etc.) for varying lengths of time to effect hydrolysis of the phenyltriethoxysilane and condensation to form polysiloxanes, and thereafter the treated solution is allowed to cool. If this solution is allowed to remain at room temperature (about 25 to 28° C.) for varying lengths of time, the above-described benzene-soluble phenylpolysiloxanes precipitate and these polymeric products can be readily removed and isolated. If instead of allowing the solution to remain at room temperature, a portion of said solution is treated so as to remove the solvent, for instance, by application of high vacuum at room temperature until dry, and the phenylsilsesquioxane polymer is then heated at elevated temperatures, the polymer will become insoluble.

In carrying out the above alkali-catalyzed reaction at elevated temperatures, the concentration of the phenyltriethoxysilane in the oxygenated solvent (for instance isobutyl methyl ketone, acetone, diethyl ketone, dibutyl ether, etc.) may be varied within the range of from about 5 to 50 percent, by weight, based on the total weight of the phenyltriethoxysilane and the solvent. The amount of alkaline material employed as catalyst can be varied, but advantageously is maintained within the range of from 0.5 to 10%, by weight, based on the weight of the phenyltrihydrolyzable silane present in the reaction mixture undergoing heat treatment.

The temperature at which the base-catalyzed reaction is carried out may also vary widely depending on the boiling point of the slovent used, concentration of catalyst, type of catalyst, etc. Generally, the temperature should be well above room temperature and advantageously is above 75° C. and may range as high as 150° C. or higher. The time of heating will, of course, depend on such factors as the amount of catalyst used, the particular solvent employed, the temperature to which it is possible to heat the reaction mixture, the concentration of the phenyltrihydrolyzable silane, etc. Ordinarily, times of the order of from about 4 to 36 hours are required to obtain the benzene soluble poly(phenylsilsesquioxane) with which our invention is concerned.

After the reaction is carried out in the presence of the alkaline material, the reaction mixture is allowed to cool to room temperature (about 25–28° C.) and it will be found that the desired phenylpolysiloxane will slowly precipitate. If the phenylpolysiloxane is removed periodically as it precipitates, it is possible to obtain a large amount of the above-described phenylpolysiloxane without any necessary further treatment.

The phenylpolysiloxanes obtained in accordance with our invention of intrinsic viscosity in benzene of between 0.10 to 0.30 are infusible solids which are still soluble in solvents such as benzene and which have unusual heat-stability. If the alkaline catalyst used in preparation of the polymer is neutralized, e.g., with acetic acid, the polymer is capable of resisting elevated temperatures (even in the presence of oxygen) of 300° C. for long periods of time without evidence of decomposition. Because of these properties, the phenylpolysiloxanes of our invention are useful for insulating coatings for electrical metallic conductors, and provide heat-resistant insulation possessing good electrical properties. Alternatively, solutions of our phenylpolysiloxanes can be cast on flat surfaces and the solvent evaporated to yield cohesive films which exhibit the unusual heat resistance described above. Such films can be used for many high temperature applications, e.g., as slot liners and as end turn winding insulation in motors.

In order that those skilled in the art may better understand how the present invention may be practiced, the following examples are given by way of illustration and not by way of limitation.

The intrinsic viscosity in benzene (identified by the symbol "$|\eta|$") referred to herein as a measurement of the molecular weight of the polymers of our invention was determined as follows. The viscometer used was a modified Ubbelohde viscometer in which in place of the straight capillary tube between the second bulb and the reservoir, a coil of two turns of capillary tubing was substituted. The dimensions of the capillaries were (a) 2 mm. diameter between first and second bulbs, and (b) 0.5 mm. diameter for coiled capillary (inside diameter of coils about 1"). The intrinsic viscosity was carried out in a constant temperature water bath maintained at about 25° C.

The actual determination of the intrinsic viscosity involved drying 0.1 gram of the polymer whose intrinsic viscosity was to be determined, in vacuum at 110° C. for three hours and then weighing the sample. A volume of reagent grade benzene was added equal to the weight of the polymer (in grams) multiplied by 100. When all the polymer had dissolved, the solution was centrifuged to settle out any foreign matter that might be present. A 5 ml. aliquot was then removed and transferred to the viscometer placed in a 25° C. constant temperature water bath. The bulbs of the viscometer were filled with the solution and the time in seconds for the solution to fall from the first to second graduations was recorded. Several dilutions were made by adding known volumes of benzene to the reservoir bulb, mixing thoroughly and then repeating the procedure. The number of seconds required for the solvent to pass through the first and second graduations was checked periodically. The intrinsic viscosity was determined by plotting the specific intrinsic viscosity ($|\eta$ sp.$|$) against concentration of one gram of polymer per hundred ml. of benzene and extrapolating the curve to C (concentration) equal to 0. The following are the formulas which were used in determining the intrinsic viscosity.

$$\eta \text{ relative} = \frac{\text{number of seconds for solution}}{\text{number of seconds for solvent}}$$

$$\eta \text{ specific} = \eta \text{ relative} - 1$$

$$\frac{\eta \text{ specific}}{C} = \frac{\eta \text{ specific}}{\text{grams polymer per 100 ml. solvent}}$$

$$|\eta| \text{ (intrinsic)} = \frac{\eta \text{ specific}}{C} \text{ as } C \longrightarrow 0$$

EXAMPLE 1

About 120.2 grams (0.5 mol) phenyltriethoxysilane was dissolved in 500 ml. of isobutyl methyl ketone and the mixture heated at the boiling point of the solution with 5.3 ml. water and 23.2 ml. of 10% aqueous tetraethyl-ammonium hydroxide for about 11.7 hours. The solution was allowed to cool to room temperature (about 25–28° C.) and thereafter allowed to remain for varying lengths of time at room temperature; periodically the precipitated phenylpolysiloxane was removed and the solution again allowed to remain at room temperature until further precipitation occurred. The following Table I shows the various times at which the reaction solution was allowed to stand, together with the weight of the deposited product. It should be noted that the solid phenylpolysiloxane deposited was soluble in benzene, chloroform and tetrahydrofuran but was insoluble in solvents such as acetone, hexane, cyclohexane, diethyl ether, carbon tetrachloride, dibutyl ether and, of course, in the isobutylmethyl ketone used originally in the reaction Table I

| Fraction Number | Days at Room Temperature | Weight Deposited, Grams | Total Weight Deposited, Grams | Percent Hydroxyl |
|---|---|---|---|---|
| 1 | 5 | 6.64 | 6.64 | 0.55 |
| 2 | 19 | 8.20 | 14.84 | 0.47 |
| 3 | 33 | 5.70 | 20.54 | 0.41 |
| 4 | 61 | 3.78 | 24.32 | 0.32 |
| 5 | 120 | 4.14 | 28.46 | |
| 6 | 128 | | 30 | |

Typical of the polymers obtained above was fraction No. 2 which was evaluated for molecular weight cryoscopically in nitrobenzene and ebullioscopically in acetone. The molecular weight was found to be in excess of 5,000. It will be noted that there was a very small percentage of residual hydroxy groups, but for the most part this amount of hydroxy is of little practical significance and under normal conditions can be reduced to zero concentration.

EXAMPLE 2

In this example, the same procedure and ingredients and proportion of ingredients were employed as in Example 1 with the exception that 25.4 grams of a 9.5% solution of tetraethyl ammonium hydroxide in water was used, and the mixture was refluxed for 8 hours instead of 11.7 hours. The reaction mixture was allowed to cool and remain (while being stirred) at room temperature for up to 194 days. During this period at three intervals, the mixture was filtered to remove the solid polymer which had accumulated. Thus, three fractions of polymer were obtained. In each instance a benzene-soluble phenylpolysiloxane having a ratio of one phenyl group per silicon atom and having an intrinsic viscosity in benzene within the range of 0.1 to 0.3 was obtained. The following Table II shows the fractions obtained and the elapsed time in days when the polymer was removed and isolated, together with the intrinsic viscosity of each of the fractions:

Table II

| Fraction Number | Days at Room Temperature | Weight Deposited, Grams | Total Weight Deposited, Grams | Intrinsic Viscosity in Benzene |
|---|---|---|---|---|
| 1a | 8 | 9.1 | 9.1 | 0.12 |
| 2a | 79 | 14.2 | 23.3 | 0.17 |
| 3a | 194 | 3.5 | 26.8 | 0.28 |

EXAMPLE 3

Similar results were obtained as in Example 1 when acetone was used as the solvent in place of the isobutyl methyl ketone employed in Example 1. The polymer isolated after 32 days (weight about 14.4 grams) was found to have an intrinsic viscosity in benzene of 0.27 when measured as described above.

As pointed out above, the polymers of the instant invention, identified as "poly(phenylsilsesquioxanes)" or "phenylpolysiloxanes" have good heat resistance and although infusible at temperatures of about 250° to 300° C., are nevertheless capable of forming cohesive films when deposited from solution.

One evidence of the versatility of the polymers of the instant invention is that such polymers are capable of being converted to compositions of higher intrinsic viscosity. Thus when one part of fraction 2a in Example 2 was dissolved in about 8.8 parts, by weight, of benzene and mixed with a few drops of acetic acid (to neutralize the alkaline catalyst) and thereafter the polymer precipitated with methanol and dried at 110° C. for about 16 hours, there was obtained a polymer which when heated in an evacuated sealed tube at 300° C. for 18 days remained colorless and odorless and completely soluble in benzene. The only difference which was noted was that the intrinsic viscosity in benzene of this heated polymer had risen to 0.51. Phenylpolysiloxane polymers of intrinsic viscosity of 0.40 and higher are more particularly disclosed and claimed in the copending application of John F. Brown and Lester Vogt, Serial No. 788,069, filed concurrently herewith and assigned to the same assignee as the present invention. Such higher intrinsic viscosity polymers described in the copending application of Brown and Vogt are made by a process different from that employed by us in making our claimed phenylpolysiloxanes.

What we claim as new and desire to secure by Letters Patent of the United States is:

1. A benzene-soluble, phenylpolysiloxane infusible at a temperature of from 250–300° C., having a ratio of one phenyl group per silicon atom and having an intrinsic viscosity in benzene of from 0.10 to 0.30 dl./g. at 25° C.

2. The process for making a benzene-soluble phenylpolysiloxane having a ratio of one phenyl group per silicon atom and having an intrinsic viscosity in benzene of from 0.10 to 0.30 dl./g. at 25° C., which process comprises heating at a temperature of at most 150° C. a phenylpolysiloxane hydrolyzate of phenyltriethoxysilane in an oxygen-containing organic solvent with an alkaline rearrangement catalyst, and thereafter isolating the phenylpolysiloxane polymer formed.

3. The process as in claim 2 in which the solvent is isobutyl methyl ketone.

4. The process as in claim 2 in which the solvent is acetone.

References Cited in the file of this patent

UNITED STATES PATENTS

| | | |
|---|---|---|
| 2,482,276 | Hyde et al. | Sept. 20, 1949 |

FOREIGN PATENTS

| | | |
|---|---|---|
| 659,013 | Great Britain | Oct. 17, 1951 |

OTHER REFERENCES

Andrianov et al.: J. Gen. Chem. (U.S.S.R.), vol. 17, pp. 1522–1527 (1947).